3,413,274
POLYMERIZATION PROCESS HAVING IMPROVED ALKYL BORON INITIATORS FOR ETHYLENICALLY UNSATURATED COMPOUNDS

Hiroshi Watanabe, Kamakura, Kinsuke Kato, Zushi, Shinji Ito, Kamakura, and Hitoshi Murozono and Toshi Nakakaki, Yokohama, Japan, assignors to Toyo Koatsu Industries, Inc., Tokyo, Japan, a corporation of Japan
No Drawing. Filed Aug. 20, 1965, Ser. No. 481,405
Claims priority, application Japan, Aug. 22, 1964, 39/46,798
13 Claims. (Cl. 260—87.3)

ABSTRACT OF THE DISCLOSURE

The polymerization of ethylenically unsaturated compounds is improved by the presence of a polymerization initiator comprising an alkyl boron compound, oxygen and hydrogen peroxide in a controlled ratio to the ethylenically unsaturated compound with molar ratios of the oxygen and hydrogen peroxide to the boron compound being within prescribed ranges.

---

This invention relates to methods of polymerizing ethylenically unsaturated compounds.

In the polymerization of ethylenically unsaturated compounds, there has already been suggested a polymerizing method wherein an alkyl boron is used as one of the two components forming a polymerization initiator together with hydrogen peroxide or oxygen. For example, it is known to polymerize vinyl compounds by using triethyl boron and hydrogen peroxide together or by using tri n-butyl boron and oxygen together.

As a result of researches with a view to improving the efficiency of alkyl borons as polymerizing initiators, we have discovered that ethylenically unsaturated compounds can be very effectively polymerized by using all three components of (1) a boron compound as hereinafter described by general formula; (2) oxygen; and (3) hydrogen peroxide; together as the polymerization initiator at a rate of 0.001 to 1.0% by weight of said boron compound to the ethylenically unsaturated compound and molar ratios of oxygen, said boron compound of 0.15/.1 to 0.7/1 and of hydrogen peroxide, said boron compound of more than 0.3/1 to form the polymerization initiator.

In the polymerization of ethylenically unsaturated compounds, according to our researches, as is evident also from the examples hereinafter presented, we have made the following findings:

(1) When said boron compound is used alone in the absence of oxygen, substantially no polymerization will occur, (2) When said boron compound and hydrogen peroxide are used together as in the above-mentioned conventional method, the polymerization velocity will be low and (3) When said boron compound and oxygen are used together as in the above-mentioned conventional method, the polymerization velocity will rise more than in case (2) above and therefore the yield of a polymer after the lapse of a fixed time will rise but still not to a satisfactory degree.

In either of the above-mentioned cases (2) and (3), if the amount of use of the boron compound is largely increased, it will be possible to increase the polymerization velocity. However, in such case, the alkyl boron and its intermediate reaction product will remain in the produced polymer and the polymer will develop the very unpleasant odor of the alkyl boron and when heated, as in processing, the unpleasant odor becomes unbearable. Furthermore, such alkyl borons are toxic to human beings and it is necessary to specifically refine the produced polymer to reduce the amount of alkyl boron compound contained thereby. It is presumed that, when an alkyl boron is oxidized with oxygen or hydrogen peroxide in the presence of an ethylenically unsaturated compound, the boron atom in the alkyl boron will convert to boric acid and it is thought that various organic compounds in which at least one alkyl radical is directly bonded to a boron atom will also be produced intermediately. The intermediate reaction product mentioned above includes such compounds which are thought to be responsible, at least in part, for the unpleasant odors described above.

As compared with the use of the respective polymerization initiators in each of the above-mentioned cases (1), (2) and (3), the present invention, wherein the three components of the above-mentioned boron compound, oxygen and hydrogen peroxide are used together in the above-mentioned proportions, even if only a small amount of the boron compound is used, the reaction velocity will be seen to increase surprisingly, the yield of a polymer will increase remarkably and the produced polymer will have no unpleasant odor as is described above. No refining step is required and the industrial importance of the present invention is very high.

In the present invention, the mechanism by which the boron compound, oxygen and hydrogen peroxide perform is not clear. However, from the facts that, if oxygen or hydrogen peroxide is not used with the boron compound, no excellent results will be obtained and that different polymerization velocities result in the use of oxygen as compared to $H_2O_2$, it may be presumed that oxygen and hydrogen peroxide react with the above-mentioned boron compound by respectively different mechanisms to produce different free radicals.

In the method of the present invention, it is also evident that the above-mentioned boron compound is more fully utilized while obtaining a high reaction velocity and yield of polymer and it is possible to reduce the amount of alkyl boron or its intermediate reaction product remaining in the polymeric product. It is furthermore probable that the boron compounds substantially completely react to finally convert the boron atoms of the boron compounds to boric acid, thus explaining the absence of unpleasant odors. According to the present invention, as compared with the known methods described above, even if the amount of the boron compound used is reduced, a sufficient reaction velocity still is obtained and considerable economic advantages result. Also, there are no disadvantages as described above due to the boron compound or its intermediate remaining in the resulting polymer.

The alkyl boron compound used in the present invention is represented by the formula:

wherein Q is $R_5$,

$OR_5$ or a halogen radical, i.e., chlorine, bromine, iodine and the like, and $R_1$, $R_2$, $R_3$ and $R_4$ are alkyl radicals and $R_5$ is an alkyl radical or hydrogen radical.

It is preferred here in practice that $R_1$, $R_2$, $R_3$ and $R_4$ are alkyl radicals of 1 to 12 carbon atoms each and $R_5$ is an alkyl radical of 1 to 12 carbon atoms or hydrogen. Typical examples of the abovementioned boron compounds are triethyl boron, tri n-butyl boron, tri-isobutyl boron, tri n-hexyl boron, trilauryl boron, di n-butylethyl boron, diisobutyl boron hydride, diethyl boron chloride, diisobutyl boric acid methyl ester and di n-butyl boric anhydride. Specifically, alkyl radical bonded to boron and having 2 to 4 carbon atoms such as ethyl, n-butyl or isobutyl is most preferred in practice.

As a manner of using the alkyl boron which is one of the components forming the polymerization initiator to be used in the present invention, any compound which can produce or liberate the above-mentioned boron compound in the reaction system can be used. For example, in polymerizing an ethylenically unsaturated compound according to this invention, if a triethyl boron-ammonia complex, oxygen and hydrogen peroxide are added and then such Lewis acid as hydrochloric or acetic acid is added, said Lewis acid and the ammonia in the above-mentioned complex will produce a salt and the triethyl boron will be liberated and will act as a polymerization initiator together with the added oxygen and hydrogen peroxide.

As described above, the amount of the alkyl boron used in the present invention is 0.001 to 1.0% by weight to the ethylenically unsaturated compound to be polymerized and specifically 0.003 to 0.5% by weight is preferable.

Substantially pure oxygen or an oxygen-containing gas, for example, air may be used in the present invention. The molar ratio of oxygen to the above-mentioned boron compound used ranges from 0.15/1 to 0.7/1, preferably 0.2/1 to 0.5/1. When the molar ratio of the oxygen to the above-mentioned boron compound is below 0.15/1 or above 0.7/1, both the reaction velocity and the yield of polymer become less. Therefore, ratios outside said range are not desirable.

The molar ratio of hydrogen peroxide to the above-mentioned boron compound is above 0.3/1 and a ratio in the range of 5/1 to 0.5/1 is specifically preferable. Here, if the molar ratio of hydrogen peroxide to the above-mentioned boron compound is below 0.3/1, both the reaction velocity and the yield of polymer become less and ratios below this value are not desirable.

The molar ratio of hydrogen peroxide to the above-mentioned boron compound may exceed 5/1; however, no commensurate advantage appears to result.

The ethylenically unsaturated compounds which can be polymerized by the method of the present invention are represented by the formula:

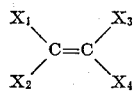

wherein $X_1$, $X_2$, $X_3$ and $X_4$ are respectively hydrogen, alkyl, substituted alkyl, alkenyl, halogen, carboxy, aryl, cyano, acyloxy, carboalkyloxy, alkoxy or carbamoyl radicals and can be the same or different.

For example, ethylene, propylene, isobutylene, itaconic acid, allyl alcohol, butadiene, vinyl chloride, vinylidene chloride, tetrafluoroethylene, acrylic acid, styrene, acrylonitrile, vinyl acetate, esters of acrylic acid, esters of methacrylic acid, maleic acid, n-butyl vinyl ether and acrylamide are typical examples.

The method of the present invention can be used in homopolymerizing the ethylenically unsaturated compounds mentioned above as well as to copolymerize two or more of said unsaturated compounds. In addition, such ethylenically unsaturated compound can be copolymerized according to this invention with any other compound, such as, carbon monoxide, copolymerizable therewith.

The reaction temperature is not specifically limited. Usually a temperature below 200° C. is used. It is very advantageous that the method of the present invention can be used at comparatively low temperatures, such as, 45° C. to −20° C.

In the present invention, the polymerization pressure to be used is not specifically limited but is properly selected and determined depending on the kind of the ethylenically unsaturated compound to be polymerized and the desired composition of the resulting polymer. For example, in the case of producing polyethylene or a copolymer composed mostly of ethylene, a reaction pressure of about 1000 kg./cm.$^2$ or higher is advantageously used. In the case of producing a copolymer of a low ethylene content (usually less than 30% by weight), it is possible to use a reaction pressure below 100 kg./cm.$^2$. In the case of polymerizing ethylenically unsaturated compounds other than ethylene, a reaction pressure below 15 kg./cm.$^2$ is usually advantageously used.

In the method of the present invention, any material which will not obstruct the polymerizing reaction may be used as a reaction medium. In practice, water is most convenient as a reaction medium. Suspension polymerization or emulsion polymerization is preferably used and any process of continuous polymerization, semicontinuous polymerization or batch polymerization can be applied.

In the present invention, needless to say, such pH regulators, molecular weight regulators and dispersing agents as are usually used in the polymerization of the ethylenically unsaturated compounds may be properly used. Furthermore, the ethylenically unsaturated compound and polymerization initiator may be properly added during the reaction in such manner as to regulate the degree of polymerization and polymerization degree distribution.

The method of the present invention is highly valuable specifically in elevating the polymerization degree of copolymers of ethylene and any other ethylenically unsaturated compound and in producing high yields of the copolymer at a comparatively low reaction pressure as below 100 kg./cm.$^2$. For example, in the conventional method of producing copolymers of ethylene and vinylidene chloride, vinyl chloride, vinyl ester or acrylonitrile, in order to increase the content of the ethylene in the copolymer, for example, above 15% by weight, at a comparatively low reaction pressure as below 100 kg./cm.$^2$, the polymerization degree and yield of polymer will tend to decrease considerably because of the intense degradative monomer chain transfer reaction of ethylene at comparatively low pressure as below 100 kg./cm.$^2$ and the use of such higher amounts is not practical. However, if the method of the present invention is used at a comparatively low temperature, such as, 45° C. to −20° C. it is possible to remarkably elevate the polymerization degree and yield of such copolymers even if at a comparatively low reaction pressure as below 100 kg./cm.$^2$.

Furthermore, when producing a copolymer by combining ethylenically unsaturated compounds which are likely to cause degradative monomer chain transfer reactions, such as, allylic compounds, vinyl ether, propylene or isobutylene with vinyl chloride, vinylidene chloride, acrylonitrile or vinyl ester, an increase in the content of the allylic compound, vinyl ether, propylene or isobutylene in the copolymer, generally the polymerization degree and yield of the copolymer will tend to decrease considerably and the use of such increased amounts is not practical. However, if the method of the present invention is used at a comparatively low reaction temperature, such as, 45° C. to −20° C., it is possible to remarkably elevate the polymerization degree and yield of such copolymer.

The method of the present invention will be highly valuable also in such cases of polymerizing ethylenically unsaturated compounds as:

(1) The case of applying it to a producing process for elevating the crystallizability of a polymer, for example, in the production of a polyethylene or polyvinyl chloride high in crystallizability, and (2) The case of applying it to a producing process for reducing the branches of a polymer, for example, the production of a linear polyvinyl acetate having few branches.

The following examples are presented:

EXAMPLE 1

Air in a glass-lined autoclave of a capacity of 5 liters was substantially completely replaced with deoxidized high purity nitrogen. Then, ion-exchange treated water which was substantially deoxidized by being boiled at 100° C. for 30 minutes in a pure nitrogen gas current, vinyl chloride, polyvinyl alcohol (dispersing agent Kurashiki Poval 217 (trade name) produced by Kurashiki Rayon Company, Ltd., Japan) and triisobutyl boron in the respective amounts in the below-mentioned Table 1 were added to the autoclave. The mixture was kept at 43° C. Oxygen and hydrogen peroxide in the respective amounts mentioned in Table 1 were added thereto and the reaction was carried out at 43° C. under 7 kg./cm.² for the times mentioned in Table 1. After the completion of the reaction, the pressure was reduced to normal by removing the residual vinyl chloride and the produced slurry was taken out, filtered, washed with water and dried. The yields of the thus-obtained vinyl chloride polymers were measured.

20 g. of a sample of each produced vinyl chloride polymer were taken and 0.4 g. of dibutyl tin maleate and 0.8 g. of stearic acid as a lubricant were added thereto. The mixture was kneaded by means of a mixing roll of 3.5 x 8 inches and kept at 180° C. The odors produced then were compared.

EXAMPLE 2

Air in an autoclave of a capacity of 5 liters made of stainless steel and provided with a stirrer was substantially completely replaced with deoxidized high purity nitrogen. Then, 2000 cc. of ion-exchange treated water substantially completely deoxidized in the same manner as in Example 1, 1000 g. of vinyl chloride, 700 g. of ethylene, 1.5 g. of polyvinyl alcohol (Kurashiki Poval 217) as a dispersing agent, 3.0 g. of tri n-butyl boron and oxygen and hydrogen peroxide in the amounts mentioned in Table 2 were added to the nitrogen in the autoclave and the reaction was carried out at 25° C. under a reaction pressure shown to be 36 kg./cm.² by gauge for 15 hours. After the completion of the reaction, the pressure was reduced to normal by removing the residual vinyl chloride and ethylene. The produced slurry was taken out, filtered, washed with water and dried. The yield of copolymer and compositions (from the chlorine analysis) and the specific viscosities (as measured at 30° C. as a solution of 0.4% nitrobenzene) of the thus-obtained ethylene-vinyl chloride copolymers were measured. Further, the odors of the respective copolymers were compared in the same manner as in Example 1. The results are shown en bloc in Table 2.

TABLE 2

| Experiment No.: | Oxygen in molar ratio TNB[1] | Hydrogen peroxide in molar ratio TNB[1] | (2) Yield in g. | Composition (weight percent) Vinyl chloride | Ethylene | Specific Viscosity | Odor | Remarks |
|---|---|---|---|---|---|---|---|---|
| 1 | | 2.0 | (2) | | | | | Comparison. |
| 2 | | 4.0 | 80 | | | | | |
| 3 | 0.30 | | 295 | 83.7 | 16.3 | 0.37 | High odor | |
| 4 | 0.60 | | 200 | 84.0 | 16.0 | 0.36 | do | |
| 5 | 0.20 | 2.0 | 630 | 83.1 | 16.9 | 0.39 | No substantial odor | Examples of the present invention. |
| 6 | 0.30 | 2.0 | 875 | 82.8 | 17.2 | 0.39 | do | |
| 7 | 0.50 | 2.0 | 805 | 83.2 | 16.8 | 0.40 | do | |
| 8 | 0.90 | 2.0 | 270 | 83.6 | 16.4 | 0.36 | High odor | Comparison. |
| 9 | 0.30 | 0.6 | 785 | 83.3 | 16.6 | 0.39 | No substantial odor | Examples of the present invention. |
| 10 | 0.30 | 4.0 | 880 | 83.1 | 16.9 | 0.38 | do | |

[1] TNB is an abbreviation of tri n-butyl boron.
[2] Trace.

EXAMPLE 3

Air in an autoclave of a capacity of 5 liters made of stainless steel and provided with a stirrer was substantially completely replaced with deoxidized high purity nitrogen. Then, 2000 cc. of ion-exchange treated water deoxidized in the same manner as in Example 1 and 1.0 g. of the same polyvinyl alcohol as was used in Example 1 as a dispersing agent were added to the nitrogen in the autoclave. The ethylenically unsaturated compound, boron compound, oxygen and hydrogen peroxide in the amounts specified in Table 3 were added thereto. The mixture was kept at the temperature mentioned in Table 3 and the reaction was carried out under the pressure mentioned in Table 3 for 15 hours. After the completion of the reaction, the pressure was reduced to normal by removing the

TABLE 1

| Ex. No. | Deoxidized ion-exchange water in cc. | Vinyl chloride in g. | Polyvinyl alcohol (dispersing agent) in percent by weight to vinyl chloride | TIB[1] in percent by weight to vinyl chloride | Oxygen in molar ratio to TIB | Hydrogen peroxide[2] in molar ratio to TIB | Yield of the produced polymer in percent by weight Reaction time | | | Odor | Remarks |
|---|---|---|---|---|---|---|---|---|---|---|---|
| | | | | | | | 5 hrs. | 10 hrs. | 15 hrs. | | |
| 1 | 2,000 | 1,000 | 0.3 | 0.020 | | | (3) | (3) | (3) | | |
| 2 | 2,000 | 1,000 | 0.3 | 0.020 | | 2.0 | 1 | 3 | 5 | No substantial odor | |
| 3 | 2,000 | 1,000 | 0.3 | 0.020 | | 4.0 | 2 | 6 | 9 | do | Comparison. |
| 4 | 2,000 | 1,000 | 0.3 | 0.020 | 0.30 | | 7 | 17 | 26 | Slight odor | |
| 5 | 2,000 | 1,000 | 0.3 | 0.020 | 0.60 | | 3 | 13 | 18 | do | |
| 6 | 2,000 | 1,000 | 0.3 | 0.200 | 0.30 | | 22 | 48 | 60 | High odor | |
| 7 | 2,000 | 1,000 | 0.3 | 0.020 | 0.20 | 2.0 | 19 | 40 | 60 | No substantial odor | Examples of the present invention. |
| 8 | 2,000 | 1,000 | 0.3 | 0.020 | 0.30 | 2.0 | 25 | 52 | 75 | do | |
| 9 | 2,000 | 1,000 | 0.3 | 0.020 | 0.50 | 2.0 | 13 | 61 | 71 | do | |
| 10 | 2,000 | 1,000 | 0.3 | 0.020 | 0.90 | 2.0 | 10 | 24 | 29 | Slight odor | Comparison. |
| 11 | 2,000 | 1,000 | 0.3 | 0.020 | 0.30 | 0.6 | 16 | 35 | 53 | No substantial odor | Examples of the present invention. |
| 12 | 2,000 | 1,000 | 0.3 | 0.020 | 0.30 | 4.0 | 25 | 51 | 77 | do | |
| 13 | 2,000 | 1,000 | 0.3 | 0.030 | 0.30 | 2.0 | 35 | 71 | 97 | do | |

[1] TIB in the above table is an abbreviation of triisobutyl boron. [2] Hydrogen peroxide in the above table was used in the form of an aqueous solution of 30%. [3] Trace.

residual gaseous monomer and the product was taken out, filtered, washed with water and dried. The yield of polymer, compositions of the produced polymers (from the carbon and hydrogen analyses in Experiment No. 1 and from the chlorine analysis in the others) and the specific viscosities of said polymers (as measured at 30° C. as a toluene solution of 0.4% in Experiment No. 1 and as measured in the same manner as is mentioned in Example 2 in the others) were measured. Further, the odors of the respective copolymers were compared in the same manner as in Example 1. The results are shown en bloc in Table 3.

TABLE 3

| Experiment No. | EC[1] Kind | EC[1] Weight in g. | BC[2] Kind | BC[2] Percent by wt.[3] | Oxygen in molar ratio to BC | Hydrogen peroxide in molar ratio to BC | Temperature, °C. | Pressure, kg./cm.² | Produced Copolymers Yield in g. | Produced Copolymers Composition in percent by wt. | Produced Copolymers Specific viscosity | Odor |
|---|---|---|---|---|---|---|---|---|---|---|---|---|
| 1 | A / C | 1,000 / 200 | F | 0.17 | 0.30 | 2.0 | 40 | 20 | 955 | A=84.1 / C=15.9 | 0.32 | No substantial. |
| 2 | B / D | 1,000 / 50 | G | 0.14 | 0.30 | 2.0 | 35 | 7 | 965 | B=97.9 / D=2.1 | 0.44 | |
| 3 | B / E | 1,000 / 30 | H | 0.19 | 0.30 | 2.0 | 25 | 6 | 950 | B=98.7 / E=1.3 | 0.40 | |
| 4 | B / C | 1,000 / 500 | I | 0.07 | 0.30 | 2.0 | 35 | 20 | 970 | B=87.5 / C=12.5 | 0.33 | |

[1] EC=Ethylenically unsaturated compounds. [2] BC=Boron compounds. [3] Percent by weight to the total amount of EC.
A=Vinyl acetate. B=Vinyl chloride. C=Ethylene. D=n-butyl vinyl ether. E=Isobutylene. F=Diethyl boron chloride. G=Di-n-butyl boronic acid methyl ester. H=Diisobutyl boron hydride. I=Diisobutyl boron anhydride.

What is claimed is:

1. In a method of polymerizing at least one polymerizable ethylenically unsaturated compound, that improvement comprising conducting said polymerizing in the presence of:

(1) a boron compound represented by the general chemical formula

wherein Q is selected from the class consisting of R₅,

OR₅ and a halogen radical, R₁, R₂, R₃ and R₄ are alkyl radicals and R₅ is selected from the class consisting of an alkyl radical and hydrogen radical, (2) oxygen and
   (3) hydrogen peroxide, in the respective amounts of 0.001 to 1.0% by weight of said boron compound to said ethylenically unsaturated compound, at the molar ratios of oxygen to said boron compound in the range of 0.15/1 to 0.7/1 and at the molar ratios of hydrogen peroxide to said boron compound of more than 0.3/1.

2. The improvement claimed in claim 1 wherein said alkyl radicals contain from 2 to 4 carbon atoms.

3. The improvement claimed in claim 1 wherein the molar ratio of oxygen to said boron compound is in the range of 0.2/1 to 0.5/1.

4. The improvement claimed in claim 1 wherein the molar ratio of hydrogen peroxide to said boron compound is in the range of 5/1 to 0.5/1.

5. The improvement claimed in claim 1 wherein the reaction temperature is in the range of 45 to −20° C.

6. The improvement claimed in claim 1 wherein said ethylenically unsaturated compound is vinyl chloride.

7. The improvement claimed in claim 1 wherein said ethylenically unsaturated compound comprises ethylene and any other ethylenically unsaturated compound copolymerizable therewith and the reaction pressure is less than 100 kg./cm.².

8. The improvement claimed in claim 7 wherein said ethylenically unsaturated compounds are ethylene and vinyl chloride.

9. The improvement claimed in claim 1 wherein said ethylenically unsaturated compound is ethylene.

10. The improvement in claim 1 wherein said ethylenically unsaturated compound comprises vinylacetate and ethylene.

11. The improvement claimed in claim 1 wherein said ethylenically unsaturated compound comprises vinyl chloride and n-butyl vinyl ether.

12. The improvement claimed in claim 1 wherein said ethylenically unsaturated compound comprises vinyl chloride and isobutylene.

13. The improvement claimed in claim 1 wherein said ethylenically unsaturated compound contains 2 to 12 carbon atoms to the molecule.

References Cited

UNITED STATES PATENTS

| | | | |
|---|---|---|---|
| 3,067,185 | 12/1962 | De Coene et al. | 260—92.8 |
| 3,112,298 | 11/1963 | Welch | 260—92.1 |
| 3,169,947 | 2/1965 | Stroh et al. | 260—92.8 |
| 3,238,186 | 3/1966 | Schultz et al. | 260—87.5 |
| 3,275,611 | 6/1966 | Mottus et al. | 260—87.3 |

FOREIGN PATENTS 587,761  8/1960  Belgium.

JOSEPH L. SCHOFER, *Primary Examiner.*